No. 762,538. PATENTED JUNE 14, 1904.
J. LAMB & J. ARPP, Jr.
VALVE DEVICE.
APPLICATION FILED FEB. 26, 1903.
NO MODEL.
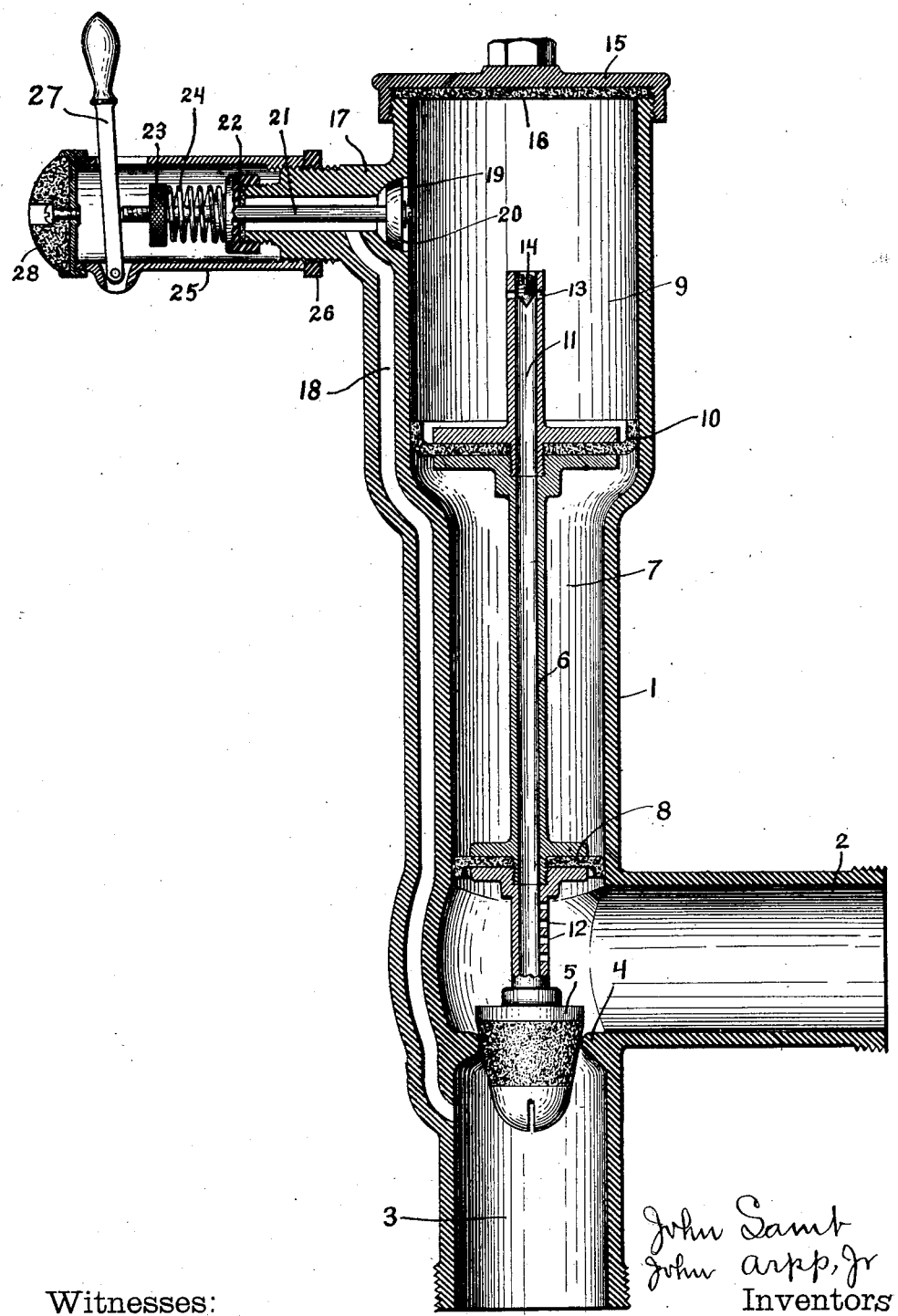
Witnesses:
Elmer R Shipley
M. S. Belden
John Lamb
John Arpp, Jr
Inventors
by James W. See
Attorney No. 762,538. Patented June 14, 1904.

UNITED STATES PATENT OFFICE.

JOHN LAMB AND JOHN ARPP, JR., OF MIDDLETOWN, OHIO.

VALVE DEVICE.

SPECIFICATION forming part of Letters Patent No. 762,538, dated June 14, 1904.

Application filed February 26, 1903. Serial No. 145,215. (No model.)

*To all whom it may concern:*

Be it known that we, JOHN LAMB and JOHN ARPP, Jr., citizens of the United States, residing at Middletown, Butler county, Ohio, have invented certain new and useful Improvements in Valve Devices, of which the following is a specification.

This invention, pertaining to improvements in valve devices and particularly applicable to closet-flushing valves, faucets, and the like, will be readily understood from the following description, taken in connection with the accompanying drawing, which is a vertical longitudinal section of a valve device embodying our invention.

In the drawing, 1 indicates the general body of the structure; 2, the water-inlet thereto, adapted to be connected in any ordinary manner with the pipe for supplying water under pressure; 3, the outlet thereof, which may, if desired, be arranged for connection with a flush-pipe or other pipe which is to conduct away the discharge controlled by the valve; 4, a valve-seat at a point intermediate between the supply-inlet 2 and the discharge 3, this valve-seat being a circular opening; 5, a valve, preferably of conical form and formed of rubber or of analogous yielding material seating within the valve-seat 4 and closing in the direction of discharge; 6, the stem of the valve; 7, a cylinder disposed axially of the valve, its lower end being in free communication with the inlet 2; 8, a piston secured to the valve-stem 6 and fitting the cylinder 7, the water-pressure from the inlet 2 having free access to the under surface of this piston; 9, a second cylinder disposed axially of the valve-stem and having a diameter in excess of that of cylinder 7, the two cylinders being in free communication with each other; 10, a piston secured upon the valve-stem and fitting cylinder 9; 11, a water-passage through the valve-stem 6; 12, ports permitting water from the inlet 2 to have free access at all times to the passage 11; 13, ports leading from the passage 11 outwardly into cylinder 9 above piston 10; 14, an adjusting-screw at ports 13 serving to adjust the effective area of those ports; 15, a bonnet removably secured upon the upper end of cylinder 9; 16, a gasket under bonnet 15 serving the double purpose of packing the joint between the bonnet and the upper end of cylinder 9 and cushioning the upper end of valve-stem 6 as it reaches the upward limit of its stroke; 17, a boss projecting laterally from cylinder 9; 18, a passage leading from the upper portion of cylinder 9 to the outlet 3; 19, a recessed valve-seat in the wall of cylinder 9 at the initial end of passage 18; 20, a valve engaging this valve-seat and opening toward the cylinder 9; 21, the stem of valve 20, the same projecting outwardly through boss 17; 22, a packing-nut on boss 17 around stem 21 to prevent outward leakage; 23, an adjustable nut on stem 21 outwardly beyond the packing-nut; 24, a spring disposed between the packing-nut and the adjusting-nut 23 and serving to urge valve 20 to closed position; 25, a housing adjustably screwed upon boss 17 and inclosing the packing-nut, spring, and adjusting-nut; 26, a lock-nut upon boss 17 serving to lock housing 25 in adjusted position upon the boss; 27, a hand-lever pivoted in the housing and engaging valve-stem 21 and serving in pressing valve 20 open, and 28 a bumper with which the outer portion of housing 25 may be provided to serve as a cushion for the seat in case the device is used in connection with a closet.

Normally the parts are as seen in the drawing. The valve 5, which will be called the "discharge-valve," is closed and the supply-pressure is exerting itself above the valve and under piston 8 and over piston 10, the tendency obviously being to hold the valve firmly to its seat. If, however, lever 27 be pressed to the right for an instant and then released, the effect will be to open valve 20 and permit free discharge of water from the upper portion of cylinder 9, the water escaping down through passage 18 and through outlet 3. This removes the pressure from above piston 10, and the result is that the pressure acting under piston 8, whose area is greater than that of valve 5, lifts valve 5 and permits the supply of water from inlet 2 to flow freely to and through the outlet 3. As the valve rises in opening the upper end of stem 6 strikes gasket 16 and becomes cushioned thereby, thus avoiding the knock of metal to metal.

Valve 20, which may be called the "relief-valve," having closed almost instantly after it has effected the relief of pressure over piston 10, the supply-pressure entering cylinder 9 through ports 13 again fills cylinder 9 and restores the pressure therein, and when the pressure in cylinder 9 over piston 10 shall have been restored to normal pressure then piston 10 being larger than piston 8 the valve will be again forced to the seat. The time during which main valve 5 will remain unclosed will be controlled by the rate of flow of water through ports 13. These ports are of comparatively small area, and their area may be adjusted by means of the screw 14. The time during which the inlet 2 is in discharge with the outlet 3 may therefore be adjusted. Main valve 5 being conical results in a graduated closure, closure being completed very slowly, thus permitting in a closet utilization the valve to perform a refill office.

The resistance of relief-valve 20 to being opened by the hand-lever is determined by the pressure in cylinder 9, which is supply-pressure, and by the tension of spring 24. Nut 23 permits the latter to be adjusted.

In the drawing the lever 27 is shown as projecting upwardly. This may not always be desirable, and any angular position may be given to the lever by adjusting housing 25 upon boss 17 and then locking it in adjusted position by means of nut 26.

It is to be observed that the valve is guided in its rising-and-falling motion entirely by the pistons 8 and 10. These pistons are packed by cup-leathers, and the consequence is that the entire guiding of the valve is effected without metal-to-metal contact. This is a very important matter where the device is employed in connection with certain kinds of water liable to produce clogging between metal surfaces in contact.

By removing bonnet 15 from the body of the structure the main valve and the pistons may be at once withdrawn as a unit for inspection or repair and at the same time the interior of the cylinders and also the valve-seat are exposed to view. Relief-valve 20 is also exposed and readily removed by first removing its outside attachments. Spring 24 is, it will be observed, entirely outside the water-containing parts of the device, and thus protected from the destruction often found consequent upon the exposure of springs to certain waters.

It has been found advantageous to terminate the opening through the valve-stem at a point above the valve and between the valve and the adjacent piston. If the opening were continued through the valve, the pressure in the valve-inlet would be against the face of the valve, and it would have a constant tendency to unseat the same; but by making the valve imperforate and terminating the opening in the stem through its side above the valve we are enabled to locate the inlet above the valve. This brings the pressure against the back of the valve, tending to normally seat it. It also brings the pressure against the smaller piston to create the differential between the valve and piston. Thus a valve-operating device is secured which, while sensitive in its action, will not have a tendency to momentarily open under sudden variations of pressure.

We claim as our invention—

1. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a cap closing the cylinder end farthest from said valve-seat, a relief-valve in said relief-passage, an elongated main valve having an area smaller than the adjacent piston, a stem for said main valve, pistons on said stem and fitting said cylinders, said stem being provided with an opening leading from the cylinder end farthest from the main valve, through the pistons, and terminating in the body part above said valve, and between the valve and adjacent piston.

2. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a cap closing the cylinder end farthest from said valve-seat, a relief-valve in said relief-passage, an elongated main valve having an area smaller than the adjacent piston, a stem for said main valve, pistons on said stem and having non-metallic peripheral surfaces fitting said cylinders, said stem being provided with an opening leading from the cylinder end farthest from the main valve, through the pistons, and terminating in the body part above said valve, and between the valve and adjacent piston.

3. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a cap closing the cylinder end farthest from said valve-seat, an elastic gasket facing the interior of said cap, a relief-valve in said relief-passage, an elongated main valve having an area smaller than the adjacent piston, a stem for said main valve adapted to impinge upon said gasket, pistons on said stem and fitting said cylinders, said stem being provided with an opening leading from the cylinder end farthest from the main valve, through the pistons, and terminating in the body part above said valve, and between the valve and adjacent piston.

4. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a cap closing the cylinder end farthest from said valve-seat, a relief-valve in said relief-passage, an elongated main valve having an area smaller than the adjacent piston, a stem for said main valve, pistons on said stem and fitting said cylinders, said stem being provided with an opening leading from the cylinder end farthest from the main valve, through the pistons, and terminating in the body part above said valve, and between the valve and adjacent piston.

5. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a cap closing the cylinder end farthest from said valve-seat, a relief-valve in said relief-passage, an elongated main valve having an area smaller than the adjacent piston, a stem for said main valve, pistons on said stem and fitting said cylinders, said stem being provided with an opening leading from the cylinder end farthest from the main valve, through the pistons, and terminating in the body part above said valve, and between the valve and adjacent piston.

6. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a cap closing the cylinder end farthest from said valve-seat, a relief-valve in said relief-passage, an elongated main valve having an area smaller than the adjacent piston, a stem for said main valve, pistons on said stem and fitting said cylinders, said stem being provided with an opening leading from the cylinder end farthest from the main valve, through the pistons, and terminating in the body part above said valve, and between the valve and adjacent piston.

7. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a valve-seat at the cylinder end of said relief-passage, a cap closing the cylinder end farthest from said valve-seat, a relief-valve at the cylinder end of said relief-passage and opening toward the cylinder, an elongated main valve having an area smaller than the adjacent piston, a stem for said main valve, pistons on said stem and fitting said cylinders, said stem being provided with an opening leading from the cylinder end farthest from the main valve, through the pistons, and terminating in the body part above said valve, and between the valve and adjacent piston.

8. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a boss projecting from said body and containing a portion of said relief-passage and having a relief-valve seat at the cylinder, a cap closing the cylinder end farthest from said valve-seat, a relief-valve at said valve-seat and having a stem projecting through said boss, a spring exterior to said boss urging said relief-valve closed, a handle for opening said relief-valve, an elongated main valve having an area smaller than the adjacent piston, a stem for said main valve, pistons on said stem and fitting said cylinders, said stem being provided with an opening leading from the cylinder end farthest from the main valve, through the pistons, and terminating in the body part above said valve, and between the valve and adjacent piston.

9. In a valve device, the combination, substantially as set forth, of a body part having an inlet and an outlet and a main-valve seat in said outlet and having two differential cylinders in axial line with said outlet-valve seat and having a relief-passage leading from the cylinder end farthest from said valve-seat, a cap closing the cylinder end farthest from said valve-seat, a relief-valve in said relief-passage, an elongated main valve having an area smaller than the adjacent piston, a stem for said main valve, pistons on said stem and fitting said cylinders, said stem being provided with an opening leading from the cylinder end farthest from the main valve, through the pistons, and terminating in the body part above said valve, and between the valve and adjacent piston.

10. The combination of a body part having an inlet, an outlet, a main-valve seat, multiple cylinders in axial line with said valve-seat and a relief-passage, a relief-valve in said relief-passage, an elongated main valve having an area smaller than the adjacent piston, a stem for the main valve, multiple pistons on said stem and fitting in said cylinders, said stem being provided with an opening leading from the cylinder end farthest from the main valve, through the pistons, and terminating in the body part above said valve, and between the valve and adjacent piston.

11. In a valve device, the combination, substantially as set forth, of a body part having an inlet and an outlet and a main-valve seat in said outlet and having two cylinders in axial line with said outlet-valve seat and having a relief-passage leading from the cylinder end farthest from said valve-seat, a boss projecting from said body and containing a portion of said relief-passage and having a relief-valve seat at the cylinder, a cap closing the cylinder end farthest from said valve-seat, a relief-valve at said valve-seat and having a stem projecting through said boss, a spring exterior to said boss urging said relief-valve closed, a main valve at said main-valve seat and opening in the direction opposite the discharge through said outlet, a stem for said main valve, pistons on said stem and fitting said cylinders, a restricted passage between the inlet and the cylinder end farthest from said main valve, a sleeve screwed on said boss and inclosing said spring, and a lever pivoted in and projecting angularly from said sleeve and engaging the stem of the relief-valve.

JOHN LAMB.
JOHN ARPP, JR.

Witnesses:
W. K. RHONEMUS,
ALBERT N. ST. JOHN.